R. PALMER.
METHOD OF MAKING TUBES.
APPLICATION FILED JAN. 5, 1920.

1,394,935.

Patented Oct. 25, 1921.

Inventor:
Robert Palmer,
by Albert G. Davis
His Attorney.

UNITED STATES PATENT OFFICE.

ROBERT PALMER, OF SCHENECTADY, NEW YORK, ASSIGNOR TO GENERAL ELECTRIC COMPANY, A CORPORATION OF NEW YORK.

METHOD OF MAKING TUBES.

1,394,935.   Specification of Letters Patent.   Patented Oct. 25, 1921.

Application filed January 5, 1920. Serial No. 349,605.

*To all whom it may concern:*

Be it known that I, ROBERT PALMER, a citizen of the United States, residing at Schenectady, county of Schenectady, State of New York, have invented certain new and useful Improvements in Methods of Making Tubes, of which the following is a specification.

The present invention comprises a method of making tubes from sheet metal, particularly from sheet iron or other ferrous metal.

Tubing has been made heretofore by electrically welding or by brazing the lapped edges of sheet metal bent into a desired tubular form. These methods result in a seam which is undesirable for some purposes.

In accordance with my present invention a seamless tubing at a lower cost is made by bringing the edges of sheet metal to be joined into contact, and while holding said edges in this position introducing molten copper in a reducing atmosphere into the contracted space between the edges. The edges to be joined are preferably held to make a butt contact by a bonding material inert with respect to and not wetted by molten copper.

Figure 2:
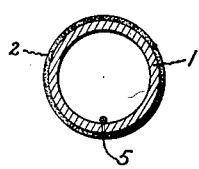
Figure 1:
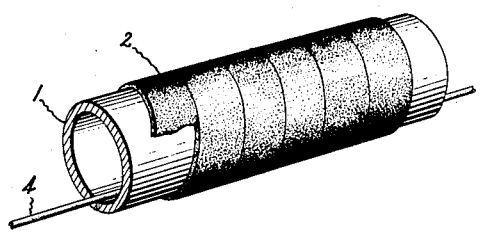
Figure 4:
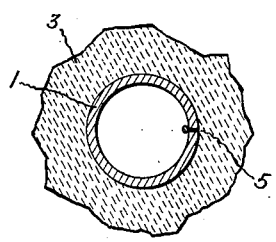
Figure 3:
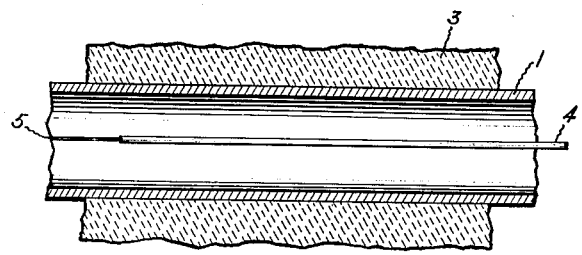
Figure 5:
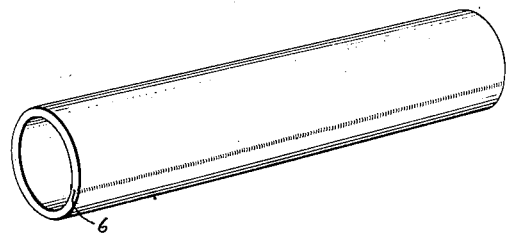

Figures 1 and 2 illustrate in perspective and cross-section respectively the production of tubing by bonding with a refractory fabric, Figs. 3 and 4 illustrate in longitudinal and cross section a modification utilizing a refractory plastic material as a bond and Fig. 5 is a perspective view of a finished tube made in accordance with my invention.

As shown in Figs. 1 to 4, the sheet metal is bent in any suitable way to constitute a tube 1 preferably with abutting edges and about this tube blank is placed a suitable inert material to prevent the abutting edges from separating when the strains in the metal are relaxed during the subsequent heating.

Preferably a bond consisting of asbestos tape 2, Fig. 1, is used but a refractory plastic such as clay which hardens when dried and heated may be used as illustrated by the broken layer 3 in Figs. 3 and 4. In general a material not wetted by copper in hydrogen and capable of withstanding the furnace temperature employed may be used.

Adjacent the abutting edges is placed a copper wire 4. The tube blank and wire thus assembled are heated in a reducing atmosphere, preferably in hydrogen, to the melting point of copper. The molten copper flows into the contracted space 5, between the abutting edges which are held in position by the bond. The tubes are cooled while bonded.

Upon the removal of the bond the tubes are ready for immediate use, no excess copper being present on the exterior. As shown in Fig. 5, the joint 6 will be found to be uniformly filled with copper so as to yield a tight seamless tube either of uniform diameter or tapered as desired.

What I claim as new and desire to secure by Letters Patent of the United States, is:—

1. The process of making tubes of ferrous metal which consists in shaping sheet metal into tubular form with the edges thereof making a butt contact, holding said metal in this form by a refractory bonding material not wetted by molten copper, and uniting the abutting edges by molten copper in a reducing atmosphere.

2. The process of making tubes of sheet iron which consists in shaping the same into tubular form with abutting edges, bonding the sheet metal in this position by winding thereon a refractory fabric, placing copper adjacent the abutting edges and fusing said copper in a hydrogen atmosphere while said materials are thus assembled thereby forming a seamless tubing.

In witness whereof I have hereunto set my hand this 3rd day of January, 1920.

ROBERT PALMER.